United States Patent

Fedorkov et al.

[15] 3,691,411

[45] Sept. 12, 1972

[54] PIEZOELECTRIC QUARTZ ELEMENT

[72] Inventors: Albert Pavlovich Fedorkov, ulitsa Lobachevskogo, 18, kv. 14; Mikhail Iosifovich Yaroslavsky, Baikalskaya ulitsa, 30, korpus 2, kv. 44; Galina Yankelevna Orlovskaya, Istrinskaya ulitsa, 3, korpus 1, kv. 55, all of Moscow, U.S.S.R.

[22] Filed: Jan. 19, 1971

[21] Appl. No.: 107,708

[52] U.S. Cl. ....................310/9.5

[51] Int. Cl. ....................H01v 7/00

[58] Field of Search ....................310/9.5

[56] References Cited

OTHER PUBLICATIONS

Buchanan, " Handbook of Piezoelectric Crystals for Radio Equipment Designers" , WADC Technical Report, 54- 248, Office of Technical Services, U.S. Dept. Comm., PB- No. 111,586, December, 1954, pp. 20, 21, 34- 45.

Cady, " Piezoelectricity" , Dover Publications, Vol. II, 1964, pp. 451- 460.

*Primary Examiner*—L. T. Hix

*Assistant Examiner*—B. A. Reynolds

*Attorney*—Holman & Stern

[57] ABSTRACT

A piezo-electric quartz element, which is a parallelepiped cut from a slab of quartz crystal, having the XYZ coordinate axes. The edges of the parallelepiped perpendicular to the Y-axis of the crystal are turned through an angle of 25° to 30° relative to the X and Z axes of the crystal. Each of the major faces of this parallelepiped makes an angle of 64° to 73° with the Z-axis of the crystal. With the faces of the element thus oriented, the second and third order temperature coefficients of frequency are practically zero.

1 Claim, 1 Drawing Figure

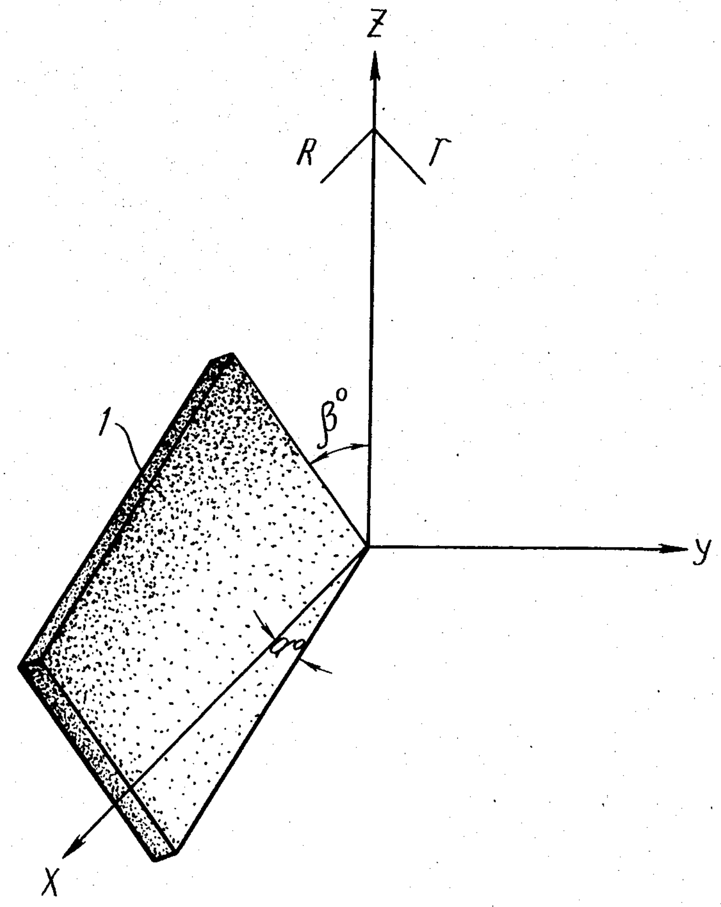
Z
R
Γ
β°
1
y
α°
X

PIEZOELECTRIC QUARTZ ELEMENT

The present invention relates to piezo-electrical engineering, and more specifically to piezo-electric quartz elements having a linear temperature-versus-frequency characteristic and intended for use in apparatus for remote measurement of temperature.

Widely known in the prior art are quartz elements intended for use as frequency standards in oscillators. The lower the dependence of the frequency of a quartz element on temperature, the higher the frequency stability of the generated oscillations. However, if the frequency of oscillation depends on temperature heavily, an oscillator using such a quartz element may be used as an instrument measuring ambient temperature and not as a frequency standard. If this potentiality is to be realized, one more condition should be satisfied, namely if the calibration of such a quartz thermometer is not to be very complicated, the frequency of oscillation should bear a linear relation to temperature.

In 1965, Hammond, Adams and Schmidt in the "ISA Transactions", vol. 4, No. 4, pp. 349–354, described an LC-quartz element meeting these requirements when excited in the thickness-shear mode and made as a plate in the form of a right parallelepiped.

Thermometers whose resonators contain such quartz elements may be fabricated for frequencies in excess of 3 or 4 megahertz and have a temperature coefficient of frequency $T_f = (1/f)\ (df/dQ) =$ (approx.) $35 \times 10^{-6}$ per deg. C., where $f$ is the frequency, and $Q$ is the temperature.

Prior-art elements can be used for temperature measurements in the range from −40° to +230°C. with a fairly high level of accuracy.

A disadvantage of thermometers using the prior-art quartz elements is that the latter cannot be made for frequencies lower than 1 MHz. On the other hand, in many remote measuring and automatic control systems where points of temperature measurements are spaced a great distance apart it is preferable to use lower frequencies which are easier to relay over great distances. Low-frequency resonators used as temperature sensors may be a considerable distance from the measuring circuit without running the risk that the transmission line will damp the signal or will pick up man-made or other noise. This is especially valuable for multi-channel telemetry systems and for equipment which cannot, for one reason or another, be installed immediately at the controlled plant (such as a nuclear reactor).

An object of the present invention is to provide a piezoelectric quartz element which has a natural frequency of 100 kHz to 1 MHz and a linear temperature-vs-frequency characteristic.

A specific object of the invention is to orient the faces of a quartz element in such a manner that the second and third order temperature coefficients of frequency are practically zero.

With these objects in view, the invention resides in that in a piezo-electric quartz element which is a plate in the form of a parallelepiped cut from a quartz crystal, according to the invention both edges of the parallelepiped normal to the Y-axis of the crystal are turned through an angle of 25 or 30° with respect to the X- and Z-axes, so that a normal to one pair of the minor faces of the parallelepiped makes an angle of 25 to 30° with the X-axis in the XZ-plane of the crystal, a normal to the other pair of minor faces of the said parallelepiped makes an angle of 25 to 30° with the Z-axis in the XZ-plane, and each of the major faces of the parallelepiped is turned through an angle of about 64° to 73° relative to the Z-axis of the crystal.

Thus cut, a piezo-electric quartz element will reduce the second and third order temperature coefficients of frequency at resonance.

The invention will be more fully understood from the following description of a preferred embodiment when read in connection with the accompanying drawing which shows the coordinate axes, a quartz element, and its orientation relative to the axes.

Referring to the drawing, there is a right parallelepiped 1 cut from a slab of quartz crystal having the X, Y and Z crystallographic axes. These axes are assumed to form a right-handed Cartesian system of coordinates. The Z-axis is directed along the third order symmetry axis of an ideal quartz crystal. If the crystal be positioned so that this axis is directed vertically, with an arbitrary positive end upwards, the Y-axis will be in a direction perpendicular to the prism face of the crystal, in the positive direction the Y-axis will cross this prism face above which is located the face $r$ of a minor rhombohedron. At the same time, the X-axis will be at right angles to the Y- and Z-axes and will make up with them a right-handed Cartesian system of coordinates. The long edges of the parallelepiped will make an angle of $\alpha = 25°$ to 30° with the X-axis in the XZ-plane. A normal to one pair of the minor faces will make an angle of 25° to 30° with the X-axis in the XZ-plane of the crystal, and a normal to the other pair of the minor faces of the parallelepiped will make an angle of 25° to 30° with the Z-axis in the XZ-plane. The major faces will be turned through an angle of $\beta =$ 64° to 73° relative to the Z-axis of the crystal.

In the general case, a piezo-element according to the invention should have the shape of a right parallelepiped. However, in a special case its major faces may be square, or bevelled, or rounded at the corners.

What is claimed is:

A piezo-electric quartz element, which is a plate in the form of a parallelepiped cut from a quartz crystal, having the XYZ coordinate axes, characterized in that the two edges perpendicular to the Y-axis of the crystal are turned through an angle of 25° to 30° to the X- and Z-axes in the XZ-plane, so that a normal to one pair of the minor faces of the parallelepiped makes an angle of 25° to 30° with the X-axis in the XZ-plane of the crystal, a normal to the other pair of the minor faces of said parellelepiped makes an angle of 25° to 30° with the Z-axis in the XZ-plane, and each of the major faces of the parallelepiped is turned through an angle of about 64° to about 73° relative to the Z-axis of the crystal.

* * * * *